United States Patent Office 3,506,609
Patented Apr. 14, 1970

3,506,609
STABILIZED OLEFIN POLYMERS
Walter Stamm, Tarrytown, N.Y., assignor to Stauffer Chemical Company, New York, N.Y., a corporation of Delaware
No Drawing. Filed May 10, 1968, Ser. No. 728,359
Int. Cl. C08f 45/58
U.S. Cl. 260—45.7                           15 Claims

ABSTRACT OF THE DISCLOSURE

High molecular weight olefin polymer compositions exhibiting a high degree of stability containing a stabilizing amount of a stabilizing compound having the formula $$(R-\underset{\underset{O}{\|}}{C}-S)_n-X$$

wherein R is a hydrocarbyl group containing from 3 to about 21 carbon atoms, $n$ is an integer having a value of from 1 to 2, X is selected from the group consisting of hydrogen, alkali metal, alkaline earth metal, and acyl moieties having a hydrocarbyl essentially hydrocarbon residue and containing from about 1 to about 17 carbon atoms inclusive. These stabilizers have proven to be particularly effective in the olefin polymers resin compositions. Included among the preferred stabilizers is thiollauric anhydride, thiololeic anhydride, thiolbenzoic anhydride and thiolstearic anhydride.

---

The present invention relates to the stabilization of polymers against degradation and discoloration due to heating. More particularly, it relates to heat stabilization of lower α-olefin polymers, especially ethylene polymer and propylene polymers. Still more particularly, the invention relates to the heat stabilization of such polymers employing certain thiol acids and derivatives thereof which are hereinafter defined.

It is well known that olefin polymers, and in particular polypropylene, undergo discoloration and degradation at the elevated temperatures required for operations such as molding and product formation. In order to overcome this problem a suitable amount of a heat stabilizing composition is generally blended with plasticized or unplasticized resinous material prior to molding. One suitable component of commercial stabilizing compositions employed widely today are the hindered phenols such as 2,6-ditertiary butyl p-cresol. Organic amines and phosphites have also been employed.

In accordance with the present invention heat stabilized olefin polymer compositions are provided containing as a stabilizer an effective amount of a compound of the type:

$$(R-\underset{\underset{O}{\|}}{C}-S)_n-X$$

wherein R is a hydrocarbyl group consisting essentially of hydrogen and carbon having from 5 to 21 carbon atoms and preferably from 6 to 17 carbon atoms, $n$ equals 1 or 2, and X is selected from the group consisting of hydrogen, alkali metal, ammonium, alkaline earth metal, zinc cadmium and an acyl moiety of the type $$-\underset{\underset{O}{\|}}{C}-R'$$

wherein R' is a hydrocarbyl group consisting essentially of hydrogen and carbon containing from about 1 to about 17 carbon atoms inclusive. The term "consisting essentially of hydrogen and carbon" refers to substituted hydrocarbon moieties containing an occasional or infrequent substituent comprising an element other than hydrogen and carbon, e.g., nitrogen or chlorine which does not materially alter the properties of the hydrocarbon residue, i.e., remains inert, as well as to purely hydrocarbon moieties. This invention is predicated upon the discovery that the incorporation of, for example, 3 percent of a compound defined above in olefin polymer gives a wholly unexpected improvement in polymer properties during heat processing. In the practice of the present invention it has been found that the incorporation of thiollauric anhydride into lower olefin polymer resin in an amount such that the sulfur content of the mixture is as low as 0.1% by weight gives an unexpected improvement in stabilization at high temperatures.

Representative groups of compounds within the scope of the above-identified formula include the aliphatic thiol acids such as the fatty thiol acids, alkali metal soaps of the fatty thiol acids, alkaline earth metal soaps of the fatty thiol acids, as well as the fatty thiolanhydrides; aromatic thiol acids, alkali metal salts of the aromatic thiol acids, alkaline earth salts of the aromatic thiol acids, as well as the aromatic thiol anhydrides.

Representative of specific compounds suitable for use in accordance with the present invention include the thiolcaproic, thiolenanthic, thiolcaprylic, thiolpelargonic, thiolcapric, thiolundecanoic, thiollauric, thiotridecanoic, thiolmyristic, thiolpentadecanoic, thiolpalmitic, thiolmargaric, thiolcarboxylic analogs of so-called neo-acids, thiolstearic, thiolnonadecanoic, thiolarachidic and thiolheneicosanoic acids, thiolnaphthenic acid, thiolbenzoic acid, phenylthiolacetic acid, methylthiolbenzoic acid, tolylthiolacetic acid, naphthalenethiolcarboxylic acids, as well as the alkali and alkaline earth salts and anhydrides thereof. Compounds containing the same number of carbon atoms as the above but which have unsaturated bonds present, e.g., undecylenic, oleic and thiolcrotonic acids, etc., are likewise suitable.

Representative of preferred specific compounds within such groups include thiolstearic acid, thiolpalmitic acid, thiolversatic acid, thiollauric acid, thiolbenzoic acid, thioltoluic acid, thiolmesitoic acid, thiolstearic anhydride, stearic palmitic thiolanhydride, thiolbenzoic anhydride, thiollauric anhydride, potassium thiololeate, soaps of thioltallates, dodecenyl succinic thiolanhydride, thiolphthalic and thioltetrahydrophthalic anhydride, and the like, as well as mixtures of such compounds.

The following compounds are illustrative of the essentially hydrocarbon moieties containing an occasional and infrequent, inert substituent other than hydrogen and carbon: alpha-hydroxythiolstearic acid, 9,10-dihydroxythiolstearic anhydride, zinc 11-aminothiolundecanoate, nitro and chlorothiolbenzoic anhydrides.

As indicated above, compounds of the type set forth above are useful in improving the thermal stability of olefin polymers including homopolymers as well as copolymers produced from vinyl halide and vinylidene halide monomers. The compounds of the type set out above are particularly useful in stabilizing ethylene and propylene polymers. The term olefin polymer as employed herein is intended to mean a polymer composition containing at least 50% of a polymer produced from a monomeric lower α-olefin.

Illustrative of the lower olefins are those containing from about 2 to about 6 carbon atoms inclusive such as ethylene, propylene, butene, pentene, hexene, and the like.

The stabilizers described herein are particularly effective in such polymer compositions as high and low density polyethylene, polypropylene, and the like. The copolymers intended herein include the lower α-olefins copolymerized with a copolymerizable monomer and containing therein a predominant amount of polymerized lower olefin therein. Particularly suitable copolymerizable monomers include copolymerizable vinyl monomers such as vinyl acetate, vinyl chloride, methyl methacrylate, ethyl methacrylate, methyl acrylate, acrylic acid, styrene acrylonitrile, acrolein, α-methyl styrene, chlorostyrene and the like.

Specific copolymers include ethylene-propylene copolymer, ethylene-propylene-diene copolymer, ethylene-butene copolymer, ethylene-vinyl acetate copolymer, ethylene-vinyl acetate-acrylic acid copolymer, ethylene acrylic acid copolymer, as well as mixtures and blends of such polymers and copolymers with olefin polymers provided a predominant amount of polymerized olefin monomer is present.

While the stabilizer compounds in accordance with those of the present invention exhibit marked improvement over closely related compounds in the prior art when employed alone, or in various combinations thereof, it is understood that the compounds of the present invention can be even more advantageously employed in combination with co-stabilizing additives known in the art which include, for example, chemical compounds of the type: organic phosphites, phenolic compounds including substituted phenols, phosphinates, phosphonates, mercaptides and sulfides, as well as other conventional stabilizers for olefin polymers.

By the term high molecular weight resin is meant a resin having a molecule weight of from 2000 to about 100,000. It is preferred to employ the stabilizers in compositions of olefin polymer having molecular weights from 7500 to 30,000 as these are the most effective polymers for general applications.

It is apparent that the percentage of the fatty thiol compound of the present invention which must be employed in making satisfactory heat stabilized compositions of the present invention in order to achieve the satisfactory improvement in heat stability, will vary over a wide range, depending upon the particular olefin polymer in which it is employed, the particular need for stabilization, the particular end use of the resin, the presence of plasticizing or other co-stabilizing additive materials, as well as the time and temperature processing requirements in making a suitable final product. The presence of between about 0.01% and about 10% by weight of the stabilizer compound of the present invention will be sufficient for most applications, although the preferable range is between about 1% and about 5% of said compound on a weight basis.

The thiol acids and anhydrides useful in the present invention can be prepared in accordance with procedures known in the literature as well as from the novel procedures hereinafter specified. Thiolstearic acid, for example, can be prepared from stearoyl chloride and hydrogen sulfide as well as from stearoyl chloride and alkali or alkaline earth salts of hydrogen sulfide. In the practice of the present invention, thiolstearic acid (M.P. 37°–41° C.) has been prepared from stearoyl chloride and hydrogen sulfide in 96 percent yield employing pyridine as an HCl acceptor. The preparation of certain other thiol acids, e.g., thiolmyristic, thiolbenzoic, as well as thiolpalmitic acids has likewise been reported in the literature. They can also be obtained by cleavage of acid anhydrides with hydrogen sulfide. In general, the organic thiol acids are practically colorless at room temperature.

It is contemplated that thiol acids can be produced in accordance with two separate, novel and useful processes as follows. Firstly, the production of such acids is contemplated by the reaction of the desired carboxylic acid, e.g., decanoic acid with phosphorus pentasulfide ($P_2S_5$) to produce the corresponding thiol acid, e.g., thioldecanoic acid. The thiol acid is then separated from side products, e.g., dithiolacids, remaining carboxylic acid and phosphorus pentasulfide, for example, by distillation. Another contemplated process route involves the cleavage of fats or other esters of fatty acids employing either hydrogen sulfied under an elevated pressure in the presence of catalysts or salts of hydrogen sulfide. Hydrogen sulfide pressure in the range of from 100 to 1000 p.s.i. are believed to be suitable for this purpose. The reaction is represented formulistically below with a glyceride, or fat, wherein R represent a suitable alphatic hydrocarbon moiety hereinbefore defined:

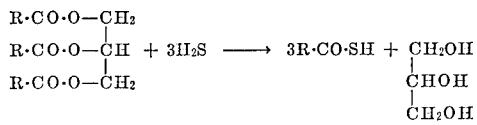

The above represented process appears highly attractive from an economic standpoint since the glycerides are readily available in commerce at low cost, e.g., tallow fats.

The alkaline earth metal soaps of thiol acids, in particular, the respective calcium, and barium soaps of thiolstearic acid can be prepared by metathetical exchange reactions between a suitable alkali thiolstearate salt and a salt of an alkaline earth metal. The soaps can also be produced by the reaction of alkaline earth oxides, acetates, carbonates, for example, with fatty thiol acids. Illustrations of the preparation of these novel compounds as well as preparation of thiolstearic anhydride and thiolbenzoic anhydride are presented below.

ILLUSTRATION 1

Zinc thiolstearate

To 62 grams (0.203 mole) of thiolstearic acid in 500 milliliters of ethanol was added 13.35 grams (0.203 mole) of 85% pure potassium hydroxide, dissolved in 125 milliliters of alcohol, with stirring at 40° C. The agitated slurry was then warmed up to 50° C. After 30 minutes 13.6 grams (0.101 mole) of anhydrous zinc chloride was added, dissolved in 300 milliliters of alcohol. The reaction mixture was warmed up to 70° C. for 30 minutes and then quickly filtered while hot. Upon cooling about 78 grams (approximately 60% of theory) of zinc thiolstearate crystallized out. More product was obtained from the mother liquor. The melting point of pure zinc thiolstearate was 92°–95° C.

ILLUSTRATION 2

Barium thiolstearate

To the slurry of 36 grams of thiolstearic acid in 500 milliliters of ethanol was added 72 grams of a 77% pure KOH in ethanol. After 30 minutes a hot, 50% aqueous ethanol solution containing 31.6 grams of barium nitrate was added to the hot, agitated potassium thiolstearate solution. After 10 minutes the hot reaction mixture was filtered and the filtrate cooled. A crystalline precipitate was recovered in practically quantitative yield. It was washed with hot water and dried over $P_2O_5$; M.P. 162°–166° C.

ILLUSTRATION 3

Thiolstearic anhydride

To 2.0 grams (0.066 mole) of thiolstearic acid in 50 milliliters of carbon tetrachloride are added 2.1 grams (0.069 mole) of stearoyl chloride and ten drops of pyridine at 40°–50° C. After one hour pyridine hydrochloride is removed by filtration, and the filtrate is evaporated to dryness. The resultant solid (5.3 grams; M.P. 76–79° C.) is recrystallized from heptane: M.P. 78–79° C.; yield practically quantitative. The compound has a sharp band in the I.R. at 5.75µ and analyzes correctly.

The heat stabilized polymeric materials of the present invention can be produced by admixing a suitable amount of the thiol compound of the present invention together with other additives desired and then blending the mixture in suitable means known in the art for this purpose. The resulting blend can then be formed into useful end products by known methods including molding, extrusion, calendering or various sheet forming operations.

The following example is presented to illustrate the improved performance of the stabilizers of the preesnt invention. In this example and throughout this specification, all parts and percentages given are by weight unless otherwise specified.

EXAMPLE

Compositions of each olefin polymer set forth below are prepared by dispersing an acetone solution or slurry of the individual stabilizer set forth below onto particulate olefin polymer. The coated polymer is dried to remove solevnt and each so stabilized composition is tested by conventional milling on a heated two roll to determine dynamic heat stability. The mill rolls are heated to a temperature sufficient to permit milling of the particular polymer and sufficiently high to degrade unstabilized polymer in two hours. Samples are taken from the mill every 10 minutes and evaluated. Unmilled samples are fluxed to form a homogeneous composition and are aged at ambient temperatures. The stabilized compositions of this invention exhibit improved stability over unstabilized olefin polymers:

Olefin polymer
Polyethylene (density .915)
Polyethylene (density .945)
Polypropylene
Ethylene-propylene-copolymer
Ethylene-acrylic acid copolymer
Ethylene-vinyl acetate copolymer

STABILIZERS

Thiollauric anhydride
Thiollauric acid
Thiololeic acid
Thiololeic anhydride
Thiolstearic anhydride
Thiolstearic acid
Thiolbenzoic anhydride

ILLUSTRATION 4

Preparation of thiolbenzoic anhydride

In 300 milliliters of hot water was dissolved 140 grams of 60% aqueous sodium sulfide. To this solution were added three grams of a commercial wetting agent (Aerosol AT trademark) and 90 grams of disodium acid phosphate hydrate as buffer. After cooling the mixture to 0° C., 280 grams of benzoyl chloride were added with continued stirring of the mixture. The batch temperature was kept below below 15° C. throughout. Thiolbenzoic anhydride was filtered from the reaction mixture, washed with cold water and dried under vacuum at 35° C. The product had a melting point of 47–49° C. and was recovered in 96% yield.

ILLUSTRATION 5

Preparation of thiollauric anhydride

In a reaction flask provided with a stirrer, dropping funnel and an efficient cold water condenser were dissolved 21.6 grams (0.1 mole) of thiollauric acid in 50 milliliters of benzene. A constant stream of dry nitrogen was sparged through the agitated solution which was warmed up to 60° C. Then 22 grams of distilled lauroyl chloride were slowly added to the reactor through the dropping funnel. The addition was completed in about 30 minutes, and the reaction was brought to completion by stirring the mixture for about four hours at reflux temperature. A small amount of pentane (about 20 milliliters) was then added to the solution which was cooled down to room temperature. Thiollauric anhydride crystallized out in good yield and high purity. M.P. 52°–54° C.

ILLUSTRATION 6

Preparation of thiololeic anhydride

Molar quantities of thiololeic acid and oleoyl chloride were reacted under conditions practically identical to those employed in Example 7. Thiololeic anhydride was isolated as a colorless oil which was analytically pure without distillation.

ILLUSTRATION 7

Preparation of thiolstearic/thiolbenzoic anhydride

One mole of thiolstearic acid is charged to a reaction vessel containing 500 milliliters of benzene as solvent. One mole of benzoyl chloride is added and ther reaction is heated to reflux and maintained at reflux for approximately 3 hours. The product is recovered by removal of the solvent.

The mixed thiolstearic/thiolbenzoic acid anhydride provides excellent stability and compatibility with PVC resins.

ILLUSTRATION 8

Preparation of thiolstearic/thiolacetic anhydride

This compound is prepared in a manner identical to that of Example 10 except that one mole of acetyl chloride is used in place of the benzoyl chloride.

What is claimed is:

1. A heat stabilized polymeric material which comprises a high molecular weight polymer selected for the group consisting of a homopolymer of a mono-olefin of 2 to 6 carbon atoms and copolymers thereof with other ethylenically unsaturated monomers and a stabilizing amount of a stabilizer compound of the type:

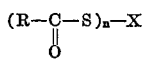

where R is a hydrocarbyl group consisting essentially of hydrogen and carbon having from 3 to 21 carbon atoms, $n$ is an integer from 1 to 2, and X is selected from the group consisting of hydrogen, ammonium, zinc, cadmium alkali metal, alkaline earth metal, and

wherein R' is a hydrocarbyl essentially hydrocarbon residue containing from 1 to 17 carbon atoms inclusive.

2. The stabilized material of claim 1 in which R is an aliphatic essentially hydrocarbon group having from 6 to 17 carbon atoms in said stabilizer compound.

3. The stabilized material of claim 1 in which R is an aromatic group.

4. The stabilized material of claim 3 in which R is phenyl.

5. The stabilized material of claim 1 in which X represents hydrogen in said stabilizer compound.

6. The stabilized material of claim 5 in which said stabilizer compound is thiolstearic acid.

7. The stabilized material of claim 1 in which X represents

wherein R' is a hydrocarbyl essentially hydrocarbon residue containing from 1 to 17 carbon atoms inclusive.

8. The stabilized composition of claim 1 wherein the olefin polymer is an ethylene-propylene-diene copolymer.

9. The stabilized material in claim 8 in which said stabilizer compound is thiolstearic anhydride.

10. The stabilized material of claim 1 in which said halogen containing polymer comprises polyethylene.

11. The stabilized material of claim 1 in which said stabilizer compound is thiolbenzoic anhydride.

12. The stabilized material of claim 1 in which said stabilizer compound is thiollauric anhydride.

13. The stabilized material in claim 1 in which said stabilizer compound is thiololeic anhydride.

14. The stabilized composition of claim 1 wherein the olefin polymer is polypropylene.

15. The stabilized material of claim 14 in which X represents

wherein R' is a hydrocarbyl essentially hydrocarbon residue containing from 6 to 17 carbon atoms.

References Cited

UNITED STATES PATENTS 3,454,521  7/1969  Tholstrup _____ 260—45.75

DONALD E. CZAJA, Primary Examiner
V. P. HOKE, Assistant Examiner

U.S. Cl. X.R.

260—45.75, 45.9, 45.95, 502.6